(12) United States Patent
Abdelnour et al.

(10) Patent No.: US 7,896,409 B2
(45) Date of Patent: Mar. 1, 2011

(54) VEHICLE FASCIA AND GRILLE ASSEMBLY

(75) Inventors: Steven A. Abdelnour, Clarkston, MI (US); Steven D. Baer, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/335,594

(22) Filed: Dec. 16, 2008

(65) Prior Publication Data

US 2010/0148525 A1 Jun. 17, 2010

(51) Int. Cl.
*B60R 19/52* (2006.01)
(52) U.S. Cl. .................. 293/115; 296/193.1; 180/68.6
(58) Field of Classification Search ............. 296/193.1, 296/143, 115, 142, 151, 155; 52/660, 311.2, 52/656.8; 293/143, 115, 142, 151, 155; 180/68.6
See application file for complete search history.

(56) References Cited

U.S. PATENT DOCUMENTS

| | | | | |
|---|---|---|---|---|
| 1,985,372 A | * | 12/1934 | Herz | 52/656.8 |
| 2,083,785 A | * | 6/1937 | Harrison, Jr. | 52/799.14 |
| 4,917,203 A | * | 4/1990 | Sacco et al. | 180/68.6 |
| D431,505 S | * | 10/2000 | Kitamura et al. | D12/163 |
| 6,422,643 B1 | * | 7/2002 | Pease | 296/193.1 |
| 7,152,915 B2 | * | 12/2006 | Diehl et al. | 296/193.1 |
| 7,311,352 B2 | * | 12/2007 | Flotzinger | 296/193.1 |
| 2007/0176441 A1 | * | 8/2007 | Lau et al. | 293/115 |

* cited by examiner

*Primary Examiner*—Glenn Dayoan
*Assistant Examiner*—SunSurraye Westbrook

(57) ABSTRACT

Vehicle fascia assembly includes a plastic fascia panel and a grille frame. The fascia panel has a grille opening defined by a flange extending rearward from the show surface toward the back side of the fascia panel. The flange has a plurality of flexure fingers at spaced intervals along the flange. The grille frame has a forward facing show surface and has a C-shaped channel molded around the outer edge of the show surface. Upon the assembly of the grille frame onto the backside of the fascia panel, the spaced apart channel legs fit onto the flange and the flexure fingers are biased and then engage with an abutment face on the grille frame, thereby attaching the grille frame onto the back side of the fascia panel without exposing the show surface of the fascia panel to injury by the grille frame during the assembly operation.

20 Claims, 6 Drawing Sheets

VEHICLE FASCIA AND GRILLE ASSEMBLY

FIELD OF THE INVENTION

The present invention relates to a radiator grille in a motor vehicle, and more particularly provides a motor vehicle fascia assembly in which a grille frame may be attached to the painted plastic fascia panel from the back side of the fascia in order to eliminate risk of injury to the show surface of the fascia panel.

BACKGROUND OF THE INVENTION

It is well known that motor vehicle bodies include a front fascia panel that covers a bumper impact beam. The front fascia panel also provides an opening by which ambient air can enter into the engine compartment to flow across the radiator and cool the vehicle engine.

The air intake opening of the plastic fascia panel is made aesthetically pleasing by the mounting of a grille assembly into the opening of the fascia. The grille assembly typically includes a rectangular plastic frame that carries an open mesh-like grille with a great many airflow openings therein.

The grille assembly is typically inserted into the opening of the fascia panel from the front side of the fascia panel and retained by a plurality of fasteners.

The disadvantage of the aforedescribed vehicle radiator grille construction is that the grille assembly is assembled onto the fascia panel from the front show surface of the fascia panel so that there is substantial risk that the grille frame will scratch or otherwise injure the painted show surface of the plastic fascia panel during the installation due to variations or mishandling that can occur during the vehicle assembly line process. In order to prevent such injury, it is common to provide a masking paper that is adhesively adhered onto the plastic fascia panel prior to the installation of the grille assembly in order to protect and cover the painted show surface against direct contact by the grille assembly. This masking procedure, while effective, adds material cost and labor cost to the assembly operation.

It would be desirable to provide a new and improved installation arrangement between a vehicle grille assembly and a molded plastic fascia panel which would eliminate the possibility of injury to the paint on the fascia panel, obviate the need for masking, improve the quality and reliability of the installation, and otherwise facilitate what can be a challenging assembly operation for the auto assembly worker.

SUMMARY OF THE INVENTION

A vehicle fascia assembly includes a plastic fascia panel and a grille frame. The fascia panel has a grille opening defined by a flange extending rearward from the show surface toward the back side of the fascia panel. The flange has a plurality of flexure fingers at spaced intervals along the flange. The grille frame has a forward facing show surface and has a C-shaped channel molded around the outer edge of the show surface. Upon the assembly of the grille frame onto the backside of the fascia panel, the spaced apart channel legs fit onto the flange and the flexure fingers are biased and then engage with an abutment face on the grille frame, thereby attaching the grille frame onto the back side of the fascia panel without exposing the show surface of the fascia panel to injury by the grille frame during the assembly operation.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
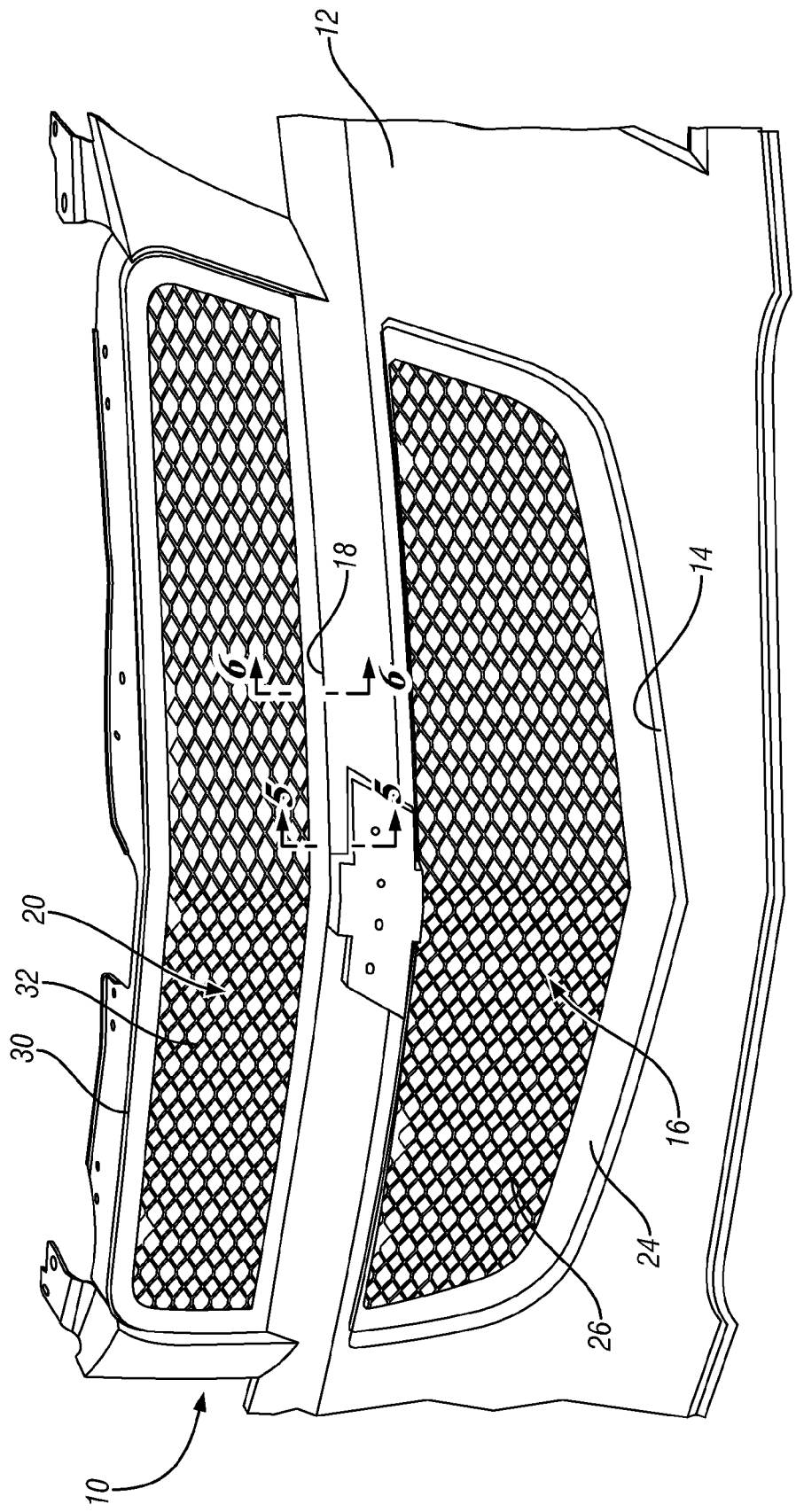
FIG. 1 is a frontal view of a motor vehicle plastic fascia panel with an upper grille assembly and a lower grille assembly mounted thereon.

Referring to FIG. 1, the front of a motor vehicle body is shown including a vehicle fascia assembly, generally indicated at 10, which includes a molded plastic fascia panel 12 having a lower grille opening 14 for receiving a lower grille assembly 16 and an upper grille opening 18 for receiving and mounting an upper grille assembly 20. The molded plastic fascia panel 12 is preferably molded in one piece and is painted to match the color of the other steel or plastic panels of the vehicle body.

Lower grille assembly 16 includes a generally rectangular grille frame 24 that is preferably chrome plated, and in which a grille 26 is mounted. Grille 26 is most often made of molded plastic which may be chromed or painted and is in the form of a grating or grid that defines a large number of small openings for passing the oncoming air into the engine compartment to flow across the vehicle radiator. Likewise, the upper grille assembly 20 includes a grille frame 30 and a grille 32 that is mounted in the grille frame 30.

Figure 2:
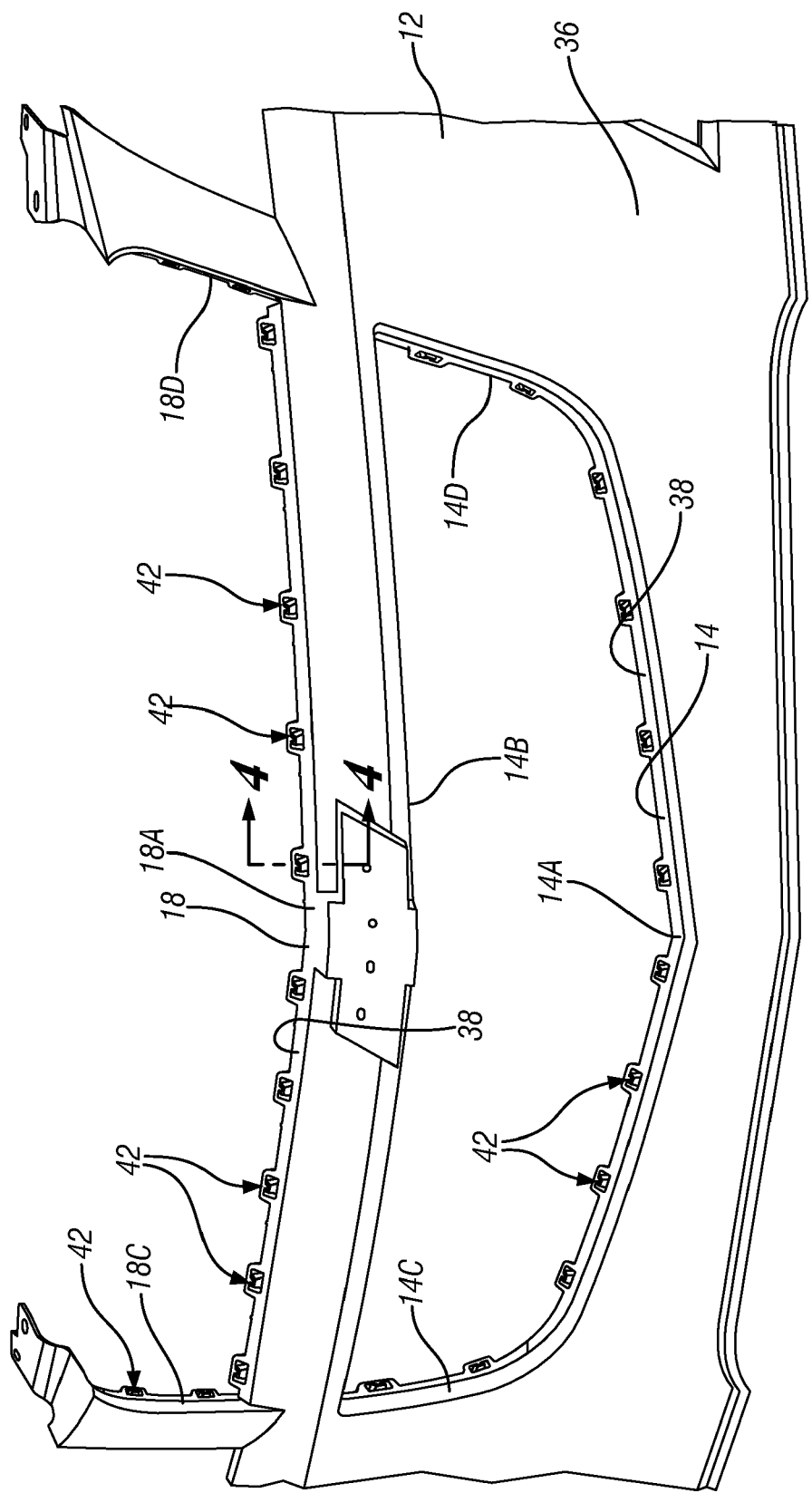
FIG. 2 is a frontal view similar to FIG. 1 showing the front of the plastic fascia panel prior to the installation of the upper and lower grille assemblies.
Figure 4:
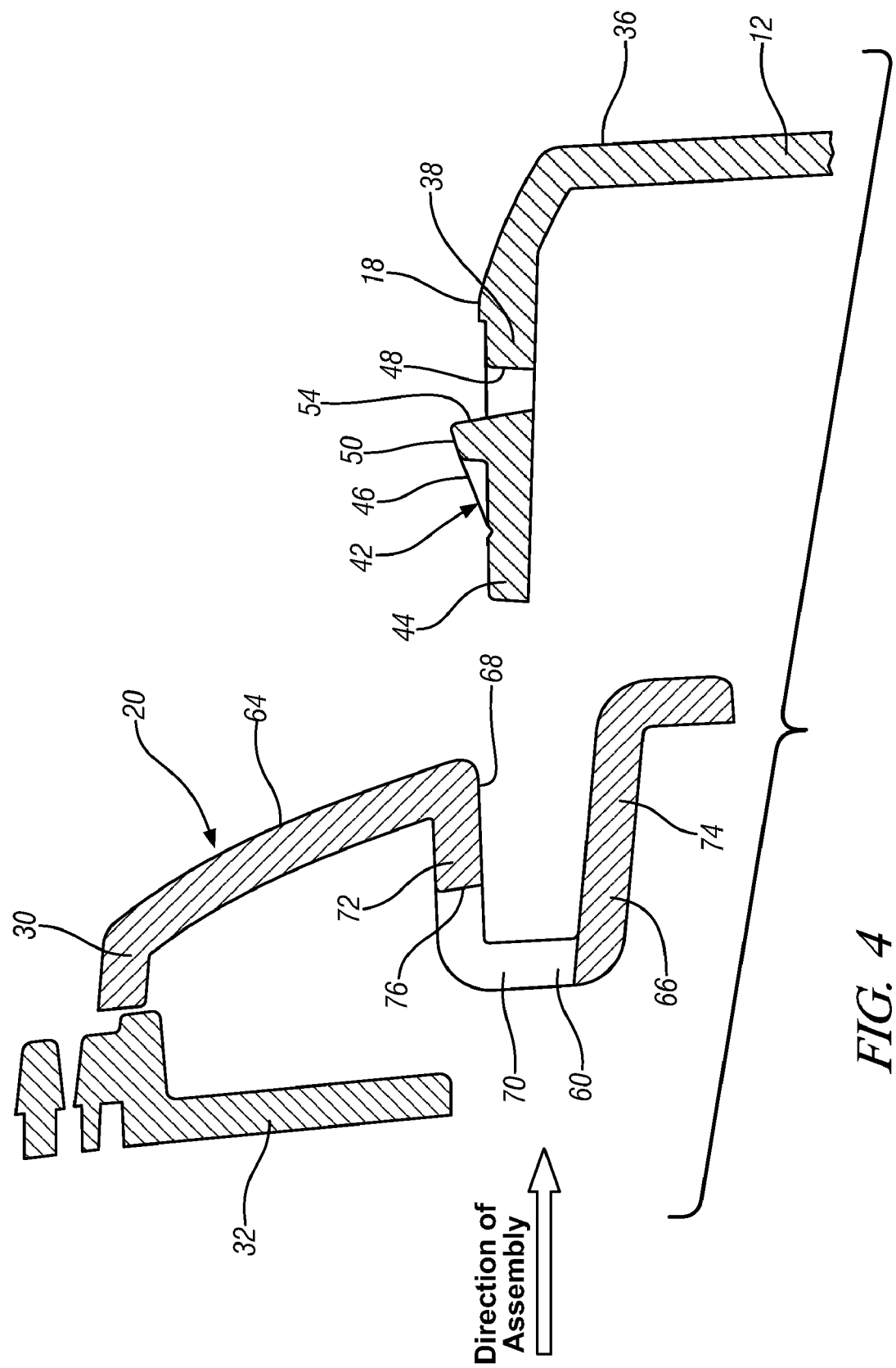
FIG. 4 is a section view taken through the fascia panel in the direction of arrows 4-4 of FIG. 2 and through the upper grille assembly in the direction of arrows 4-4 of FIG. 3, and showing the parts poised for assembly.

FIG. 2 shows the plastic fascia panel 12 prior to the installation of the lower grille assembly 16 into the lower grille opening 14 and the installation of the upper grille assembly 20 into the upper grille opening 18. As best seen in FIGS. 2 and 4, fascia panel 12 has a forward facing show surface 36 that is painted. The upper grille opening 18 in the plastic fascia panel 12 is defined by a flange 38 that is molded integrally with the show surface 36 and extends rearwardly from the show surface 36 toward the back side of the fascia panel 12. The flange 38 is provided on the lower edge 18A and the opposed side edges 18C and 18D of the upper grille opening 18. The flange 38 has a plurality of flexure fingers 42 molded integrally therewith at regularly spaced intervals along the length of the flange 38. Likewise, as seen in FIG. 2, the lower grille opening 14 is also defined by a flange 38 having these flexure fingers 42 regularly spaced along the flange 38 around the perimeter of the lower grille opening 14. The lower grille opening 14 includes opposing lower edge 14A and upper edge 14B, and also opposing side edges 14C and 14D.

Figure 7:
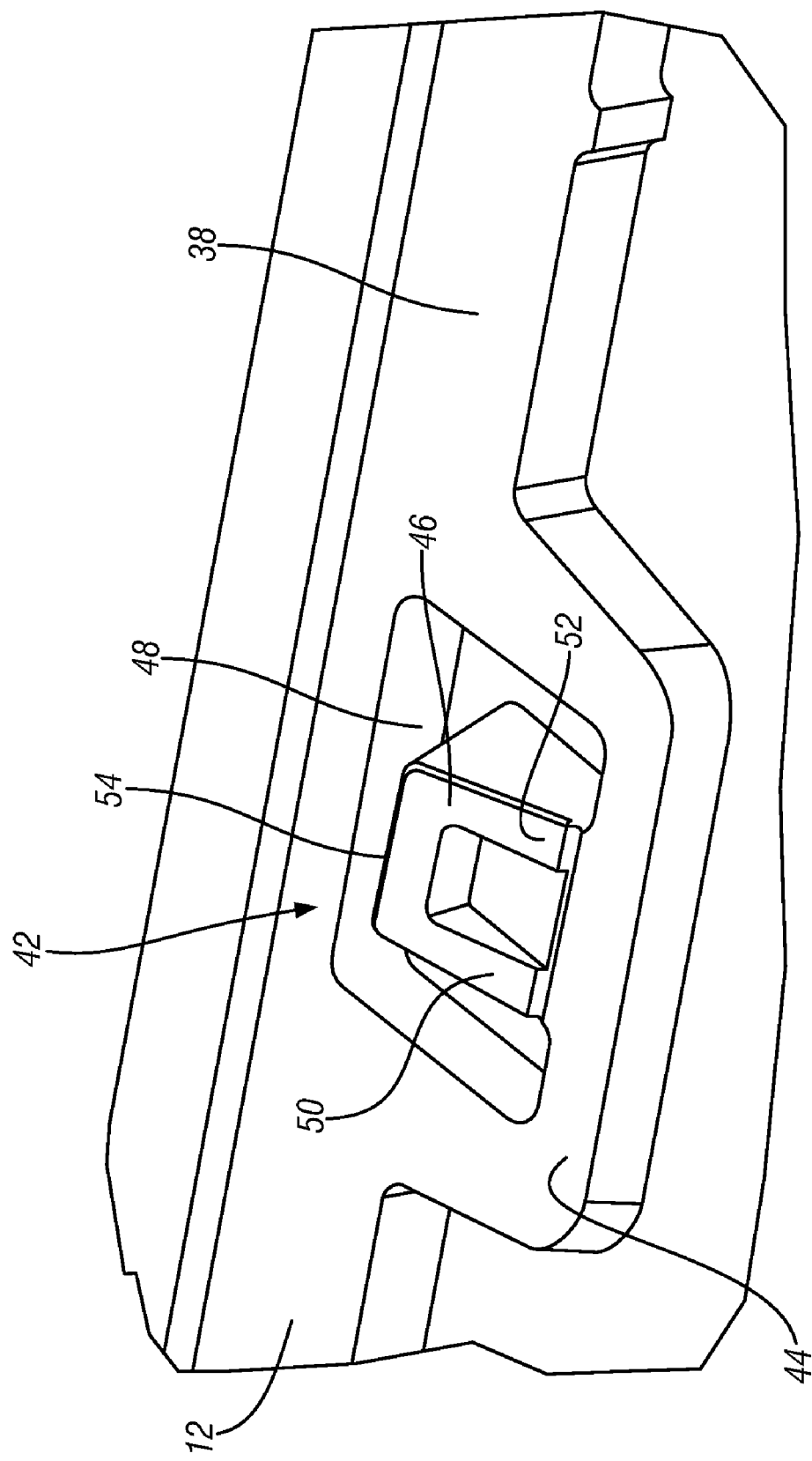
FIG. 7 is an enlarged perspective view of one of the flexure fingers of the plastic fascia panel.

Referring to FIGS. 4 and 7, it is seen that each of these flexure fingers 42, as best seen in FIG. 7, include a tongue 44 that extends rearward from the flange 38. The tongue 44 has a U-shaped opening 48 that defines the edges of the flexure finger 42. The flexure finger 42 is molded to include a ramped abutment 46, having inclined ramp surfaces 50 and 52 and also an abutment face 54.

Figure 3:
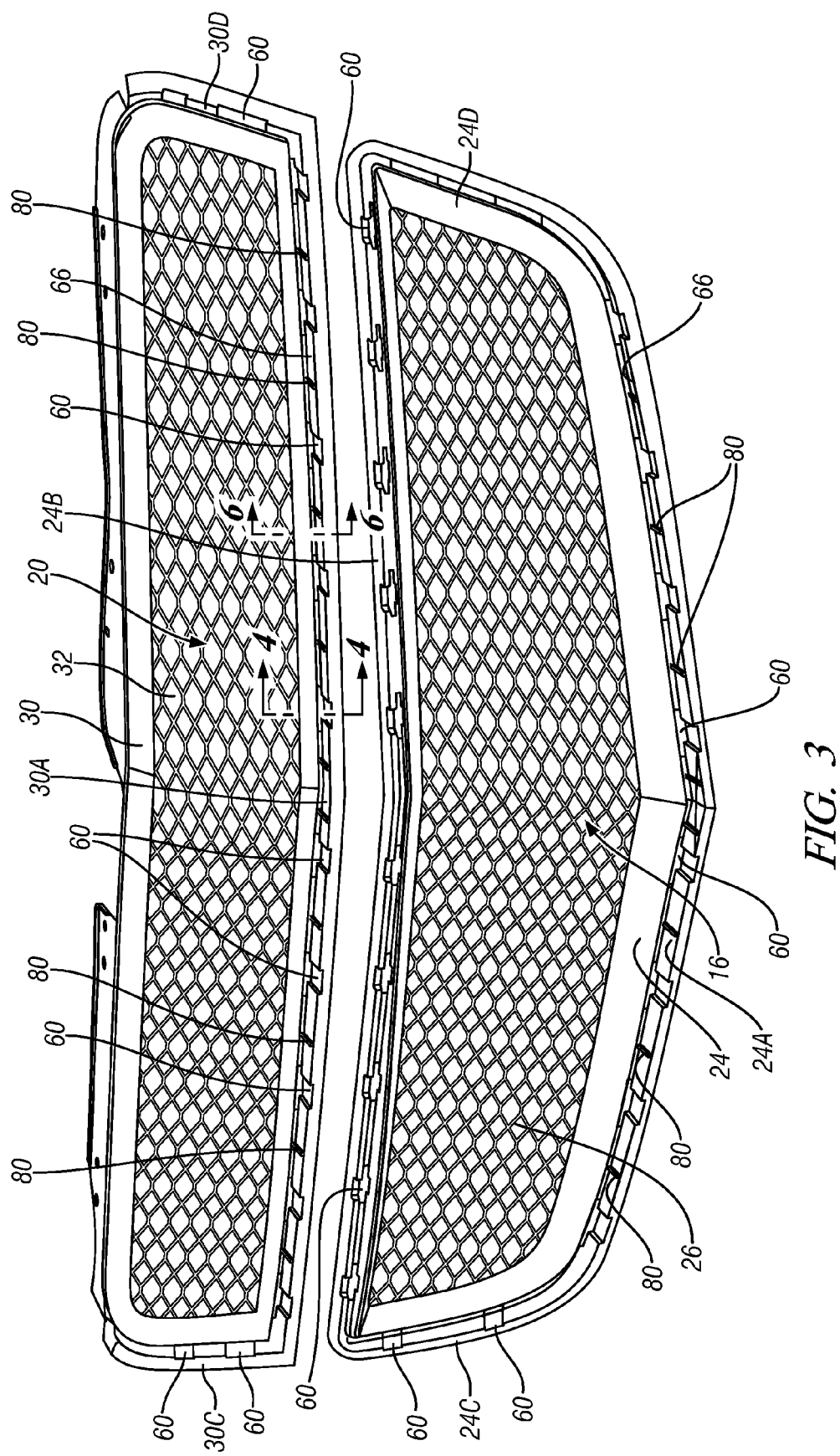
FIG. 3 is a frontal view similar to FIG. 1 showing the front of the upper grille assembly and the lower grille assembly prior to their installation into the fascia panel.

Referring to FIG. 3, it is seen that the grille frame 30 of the upper grille assembly 20 has a plurality of slots 60 provided therein at regularly spaced intervals that will register with the plurality of flexure fingers 42 provided on the plastic fascia panel 12. The slots 60 are provided at the base of a C-shaped channel 66 that is molded integrally around the perimeter of the upper grille frame 30 as will be discussed in more detail hereinafter. In addition, as seen in FIG. 3, a plurality of locating ribs 80 is provided around the periphery of the upper grille frame 30. These locating ribs 80 are provided within the C-shaped channel 66 and between the slots 60, as will be discussed in more detail hereinafter.

As best seen in FIG. 4, the grille frame 30 has a forward facing show surface 64 and a C-shaped channel 66 molded integrally around the outer peripheral edge 68 of the show surface 64. The C-shaped channel 66 includes a base leg 70 and spaced apart inner channel leg 72 and outer channel leg 74. The slots 60 of the grille frame 30 are molded in the base leg 70 of the C-shaped channel 66, and also form an abutment face 76 that faces rearwardly. In FIG. 3, it is seen that the C-shaped channel 66 is provided on lower edge 30A of the grille frame 30, and along the opposed side edges 30C and 30D of the lower grille frame 30. And the C-shaped channel 66 is also provided on the opposing lower edge 24A and upper edge 24B of the lower grille frame 24, as well as on the opposing side edges 24C and 24D of the lower grille frame 24.

Figure 5:
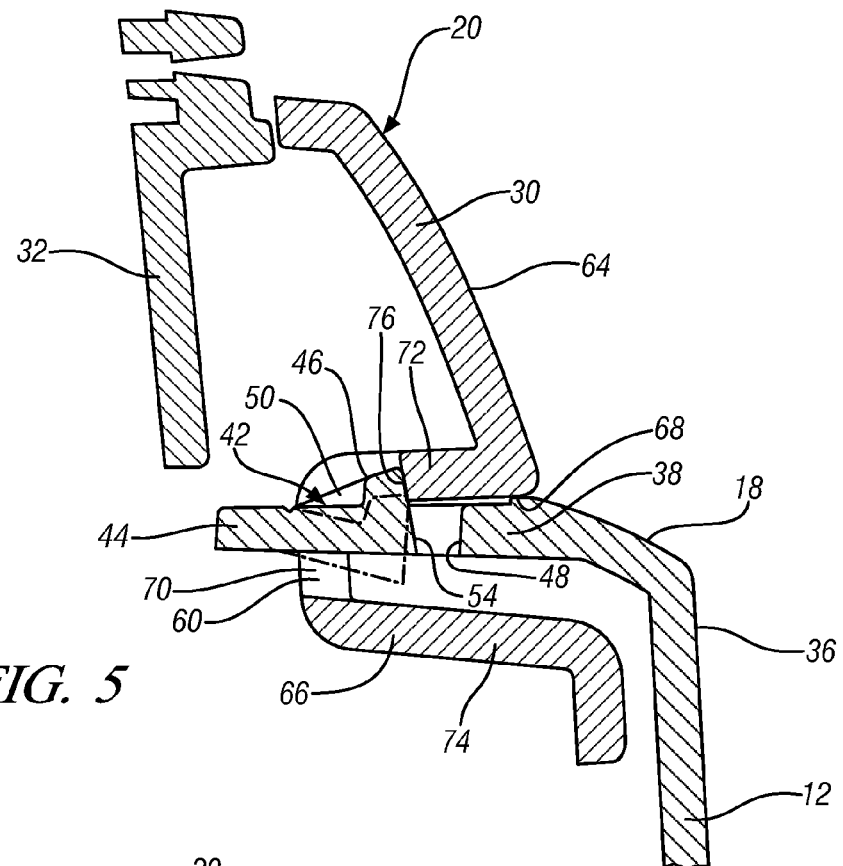
FIG. 5 is a section view taken through the assembled together fascia panel and the upper grille assembly in the direction of arrows 5-5 of FIG. 1.

Referring to FIG. 5 it is seen that the grille assembly 20 has been installed onto the fascia panel 12 by moving the grille assembly 20 rightwardly from its position of FIG. 4 onto the flange 38 of the fascia panel 12. In particular, it is seen that the space between the spaced apart inner channel leg 72 and outer channel leg 74 has received the tongue 44 of the flexure finger 42 of the fascia panel 12 to guide the acceptance of the grille assembly 20 onto the back side of the fascia panel 12. As the installing movement has progressed, the peripheral edge corner 68 of the grille frame 30 will have engaged with the ramp surfaces 50 and 52 of the flexure finger 42 to bias the flexure finger 42 downwardly to its phantom-line indicated position of FIG. 5 as the grille frame 30 is installed into the grille opening 18. When the grille assembly 20 has been fully seated upon the fascia panel 12, the flexure finger 42 will flex back to the original position and thereby the abutment face 54 of the flexure finger 42 has become engaged with the mating abutment face 76 in the slot 60 provided on the grille frame 30. In addition, referring again to FIG. 2, the alignment and installation of the grille frame 30 into the upper grille opening 18 is assisted by the fact that the flexure fingers 42 provided on the opposed side edges 18C and 18D of the grille opening are mated into the corresponding parts of the C-shaped channel 66 of the opposed side edges 30C and 30D of the grille frame 30.

Thus, during the installation process, there is no possibility that the grille assembly 20 can injure the painted show surface 36 of the plastic fascia panel 12 because the grille assembly 20 is installed from the back side of the fascia panel 12. Furthermore, the only contact of the fascia panel 12 with the grille frame 30 occurs only when the ramp surfaces 50 and 52 have contact with the peripheral corner 68 of the grille frame 30. Thus, there is no opportunity for contact of grille frame 30 with the show surface 36 of the fascia panel 12, and no need to mask or otherwise protect the show surface 36.

Figure 6:
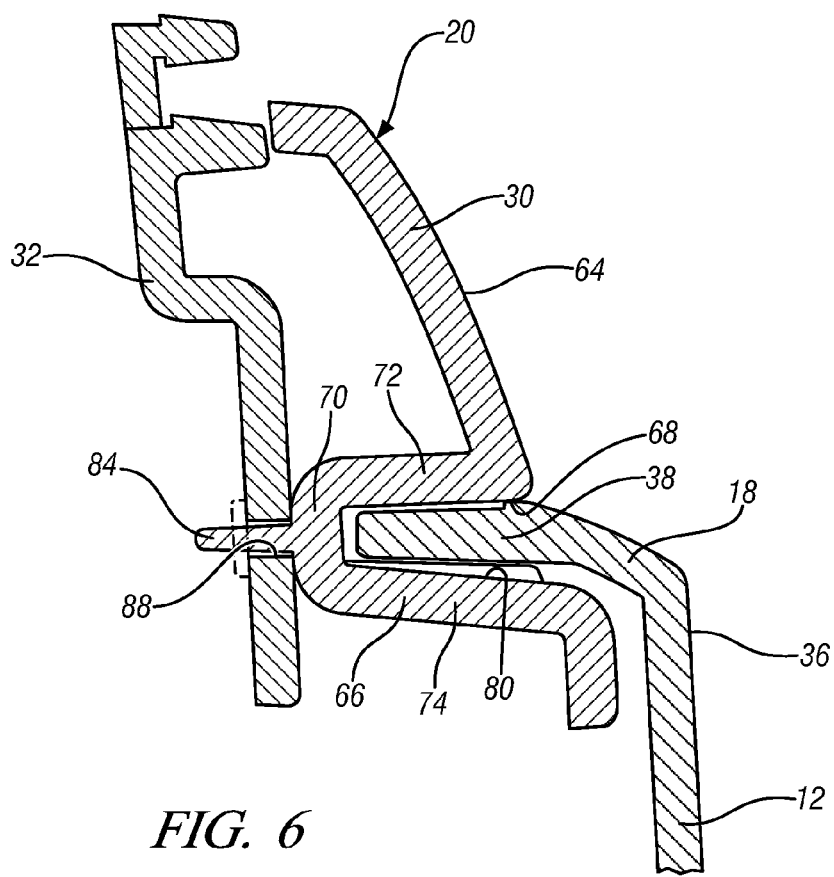
FIG. 6 is another section view taken through the assembled together fascia panel and upper grille assembly taken in the direction of arrows 6-6 of FIG. 1.

Referring to FIG. 6 and FIG. 3, it will be seen that the plurality of locating ribs 80 are molded integrally on the outer channel leg 74 at spaced intervals around the C-shaped channel 66. Preferably, as shown in FIG. 3, one of these locating ribs 80 is provided between each of the slots 60 of the C-shaped channel 66. These locating ribs 80 are engaged by the flange 38 of the fascia panel 12 during the assembly operation and serve to refine the locating and guidance of the C-shaped channel 66 onto flange 38 during the assembly operation. These locating ribs 38 can be adjusted in dimension by trimming the injection molding die in which the grille frame 30 is molded. It will be appreciated that it is relatively easier to trim the height of the locating ribs 80 during part tryout where needed rather than make greater adjustments to the injection molded die trying to change the location of the channel leg.

Referring again to FIG. 6, it is seen that the grille 32 is attached to the grille frame 30 by heat staking, including in particular a heat stake 84 that is integrally molded with the base leg 70 of the C-shaped channel 66 to fit through openings 88 that are provided in the grille 32. Heat staking is a well known process in which a hot tool will melt and deform the stake 84 to the position of FIG. 6 in which the grille 32 is thereby permanently attached to the grille frame 30. It will be appreciated that the base leg 70 of the C-shaped channel 66 is hidden from view in the completed assembly and thus is not a show surface. Thus the heat staking is just one example of the possible fasteners that can be used to attach the grille frame 30 to the base leg 70. For example, instead of heat staking, screws, rivets or various snap attachment features can be employed in the alternative.

Thus, it is seen that a new and improved vehicle fascia assembly is provided in which the grille assembly is assembled onto the plastic fascia from the back side via flexure fingers and a C-shaped channel construction, thereby obviating the concerns that the grille assembly operation will scratch the show surface of the fascia panel, and thereby eliminating the need to mask the fascia panel with a protective covering.

What is claimed is:

1. A vehicle fascia assembly comprising:
a plastic fascia panel having a back side and a forward facing show surface having a grille opening therein for receiving a grille frame, said grille opening being defined by an integrally molded flange extending rearward from the show surface toward the back side of the fascia panel at a peripheral edge of the grille opening, said flange having a plurality of flexure fingers molded integral therewith at spaced intervals along the flange, and
a grille frame having a forward facing show surface and having a C-shaped channel molded integrally around an outer edge of the show surface and including a base leg and spaced apart channel legs; one of said legs having a plurality of abutment faces provided thereon at spaced intervals and registering with the plurality of flexure fingers of the grille frame so that upon the assembly of the grille frame onto the backside of the fascia panel the spaced apart channel legs fit onto the flange of the fascia panel, the flexure fingers are biased by the one leg and then engage with the abutment face to attach the grille frame to the back side of the fascia panel without exposing the show surface of the fascia panel to possible injury by the grille frame during the assembly operation.

2. The vehicle fascia assembly of claim 1 further comprising one of the spaced apart channel legs having molded thereon a plurality of locating ribs that project toward the other of the channel legs to narrow the effective width of the spacing between the channel legs to guide the C-shaped channel onto the flange of the fascia panel.

3. The vehicle fascia of claim 2 further comprising locating ribs being provided intermediate the abutment faces.

4. The vehicle fascia assembly of claim 1 further comprising the plastic fascia having the plurality of flexure fingers along at least two opposed edges of the grille opening.

5. The vehicle fascia assembly of claim 2 further comprising the plastic fascia having the plurality of flexure fingers along at least two opposed edges of the grille opening.

6. The vehicle fascia assembly of claim 3 further comprising the plastic fascia having the plurality of flexure fingers along at least two opposed edges of the grille opening.

7. The vehicle fascia of claim 1 further comprising said abutment faces of the one leg of the C-shaped channel being provided by a slot that receives the flexure finger.

8. The vehicle fascia assembly of claim 7 further comprising the plastic fascia having the plurality of flexure fingers along at least two opposed edges of the grille opening.

9. The vehicle fascia assembly of claim 7 further comprising the grille opening in the fascia panel being generally rectangular in shape and having a plurality of flexure fingers provided along each of the sides of the perimeter of the grille opening, and the grille frame being generally rectangular in shape and having the C-shaped channel extending along each of the sides of the perimeter of the grille frame.

10. A vehicle fascia assembly comprising:
a plastic fascia panel having a back side and a forward facing show surface having a grille opening therein for receiving the grille frame, said grille opening being defined by an integrally molded flange extending rearward from the show surface toward the back side of the fascia panel at a peripheral edge of the grille opening, said flange having a plurality of flexure fingers molded integral therewith at spaced intervals along the flange, and
a grille frame having a forward facing show surface with an opening therein for mounting a grille and having a C-shaped channel molded integrally around the outer edge of the show surface and including a base leg and spaced apart channel legs; said base leg having a plurality of slots molded at spaced intervals along the base leg and defining a plurality of abutment faces, said slots of the grille frame registering with the flexure fingers of the fascia panel so that upon the assembly of the grille frame onto the backside of the fascia panel the spaced apart channel legs fit over the flange and of the fascia panel and the flexure fingers are accepted into the slots of the base leg and the flexure fingers engage with the abutment faces to attach the grille frame to the back side of the fascia panel without exposing the show surface of the fascia panel to possible injury by the grille frame during the assembly operation.

11. The vehicle fascia assembly of claim 10 further comprising one of the spaced apart channel legs having molded thereon a plurality of locating ribs that project toward the other of the channel legs to narrow the effective width of the spacing between the channel legs to guide the C-shaped channel onto the flange.

12. The vehicle fascia of claim 2 further comprising the locating ribs being provided intermediate the flexure fingers so as to not register with the slots and the slots fingers.

13. The vehicle fascia assembly of claim 10 further comprising the plastic fascia having a plurality of flexure fingers along at least two opposed edges of the grille opening.

14. The vehicle fascia assembly of claim 11 further comprising the plastic fascia having a plurality of flexure fingers along at least two opposed edges of the grille opening.

15. The vehicle fascia assembly of claim 12 further comprising the plastic fascia having a plurality of flexure fingers along at least two opposed edges of the grille opening.

16. The vehicle fascia of claim 10 further comprising a plurality of locating ribs located on the channel leg not having the abutment face that is engaged by the flexure finger, said locating ribs narrowing the effective width of the spacing between the channel legs to guide the C-shaped channel onto the flange of the fascia panel.

17. The vehicle fascia assembly of claim 16 further comprising the plastic fascia having a plurality of flexure fingers along at least two opposed edges of the grille opening.

18. The vehicle fascia assembly of claim 16 further comprising the grille opening in the fascia panel being generally rectangular in shape and having a plurality of flexure fingers provided along each of the sides of the perimeter of the generally rectangular opening, and the grille frame being generally rectangular in shape and having the C-shaped channel extending along each of the sides of the perimeter of the generally rectangular grille frame.

19. A vehicle fascia assembly comprising:
a plastic fascia panel having a back side and a forward facing show surface having a grille opening therein for receiving the grille frame, said grille opening being defined by an integrally molded flange extending rearward from the show surface toward the back side of the fascia panel at a peripheral edge of the grille opening, said flange having a plurality of flexure fingers molded integral therewith at spaced intervals along the flange, said flexure fingers including a ramped surface projecting from the flange and into the grille opening and an abutment face facing toward the show surface of the fascia panel;
a grille frame having a forward facing show surface with an opening therein for mounting a grille and having a C-shaped channel molded integrally around the outer edge of the show surface and including a base leg and spaced apart channel legs adapted to fit onto the flange of the fascia panel upon the assembly of the grille frame onto the backside of the fascia panel, said base leg having a plurality of slots molded at spaced intervals along the base leg and registering with the plurality of flexure fingers of the grille frame, said slots being defined in part by an abutment face on one of the channel legs that becomes engaged by the abutment face of the flexure fingers to attach the grille frame to the fascia panel, and a plurality of locating ribs molded on the other of the channel legs to narrow the effective width of the spacing between the channel legs and guide the C-shaped channel onto the flange of the fascia;
whereby the grille frame is attached to the back side of the fascia panel without exposing the show surface of the fascia panel to possible injury by the grille frame during the assembly operation.

20. The fascia assembly of claim 19 further comprising said locating ribs being provided at spaced intervals along the C-shaped channel between the spaced apart slots.

* * * * *